United States Patent

Woller et al.

[11] Patent Number: 5,413,192
[45] Date of Patent: May 9, 1995

[54] TREE STAND WITH CONFORMING SEAT

[76] Inventors: Ronald R. Woller, 2305 Stratford Rd. SE; John A. Woller, 2311 College St. SE, both of Decatur, Ala. 35601

[21] Appl. No.: 91,024

[22] Filed: Jul. 14, 1993

[51] Int. Cl.$^6$ .................................................. E04G 3/00
[52] U.S. Cl. ................................... 182/187; 182/188
[58] Field of Search ............. 182/187, 188, 133–136; 297/218, 440.11, 452–456

[56] References Cited

U.S. PATENT DOCUMENTS

| | | | |
|---|---|---|---|
| 2,689,602 | 9/1954 | Morgan | 297/440.11 X |
| 3,485,320 | 12/1969 | Jones | 182/129 |
| 3,856,111 | 12/1974 | Baker | 182/135 |
| 3,871,482 | 3/1975 | Southard | 182/187 |
| 3,955,645 | 5/1976 | Dye | 182/135 |
| 3,960,240 | 6/1976 | Cotton | 182/20 |
| 4,130,180 | 12/1978 | Ferguson et al. | 182/187 |
| 4,137,995 | 2/1979 | Fonte | 182/135 |
| 4,168,765 | 9/1979 | Ferguson et al. | 182/135 |
| 4,230,203 | 10/1980 | Sweat et al. | 182/134 |
| 4,244,445 | 1/1981 | Strode | 182/136 |
| 4,258,951 | 3/1981 | Groom | 297/440.11 X |
| 4,316,526 | 2/1982 | Amacker | 182/135 |
| 4,321,983 | 3/1982 | Nelson | 182/136 |
| 4,331,216 | 5/1982 | Amacker | 182/135 |
| 4,417,645 | 11/1983 | Untz | 182/135 |
| 4,427,092 | 1/1984 | Tentler | 182/134 |
| 4,452,338 | 6/1984 | Untz | 182/187 |
| 4,474,265 | 10/1984 | Shinkle | 182/187 |
| 4,475,627 | 10/1984 | Eastridge | 182/187 |
| 4,597,473 | 7/1986 | Peck | 182/187 |
| 4,787,476 | 11/1988 | Lee | 182/116 |
| 4,802,552 | 2/1989 | Williams | 182/187 |
| 4,813,441 | 3/1989 | Kepley | 135/90 |
| 4,890,694 | 1/1990 | Williams | 182/187 |
| 4,942,942 | 7/1990 | Bradley | 182/137 |
| 4,953,662 | 9/1990 | Porter | 182/135 |
| 4,987,972 | 1/1991 | Helms | 182/187 |
| 5,016,733 | 5/1991 | Bradley | 182/187 |
| 5,049,110 | 9/1991 | Owens | 452/187 |
| 5,086,874 | 2/1992 | Treants | 182/187 X |
| 5,103,935 | 4/1992 | Amacker | 182/187 |
| 5,167,298 | 12/1992 | Porter | 182/187 |

*Primary Examiner*—Alvin C. Chin-shue
*Attorney, Agent, or Firm*—Burns, Doane, Swecker & Mathis

[57] ABSTRACT

A tree stand includes a platform attachable to a tree so as to be substantially horizontal and a pivotally connected seat structure. The seat structure includes a first U-shaped member attachable to the tree, and a V-shaped member with its splayed arms pivotally connected to the U-shaped member. A flexible seat material is suspended between the apex of the V-shaped member and the transverse portion of the U-shaped member so as to make a seat conformable to the posterior of the outdoorsman, when seated. The seat element is pleated so as to be bowl-shaped to more naturally conform to the outdoorsman's posterior.

12 Claims, 5 Drawing Sheets

TREE STAND WITH CONFORMING SEAT

BACKGROUND OF THE INVENTION

The present invention relates generally to a tree stand for use by outdoorsmen as elevated platforms. More particularly, the present invention deals with a tree stand having a retractable, conforming seat.

Outdoorsmen such as hunters, naturalists, and photographers use tree stands to gain an elevated vantage point to pursue their vocations, as well as avocations. However, outdoorsmen need a stable platform that is substantially free of instability during use, is comfortable, and portable. Moreover, salability of tree stands demands that manufacturing costs be low so that the resulting product can be attractively priced in the retail market.

Various designs for tree stands are known which assist an outdoorsman in concealing himself from wildlife in an elevated position to minimized disturbance of the natural surroundings of game animals and observation subjects. Numerous patents involving a variety of construction techniques for platforms attachable to a tree are, of course, known. Many of those devices do not have a seat, unless the base platform is used as such. U.S. Pat. Nos. 4,130,180 and 4,168,765 both issued to Ferguson et al., 4,427,092 issued to Tentler, 4,597,473 issued to Peck, and 4,942,942 and 5,016,733 both issued to Bradley, are examples of tree stands and tree climbing devices which do not have separately defined seat areas.

Certainly, it will be appreciated that outdoorsmen using tree stands for extended observation periods will tire of standing and prefer to sit. Recognizing this elementary fact, a variety of tree stands have also been designed having seats of different characteristics. A tree climber having a simple bar as a seat is illustrated in U.S. Pat. No. 3,856,111 issued to Baker, while a seat fashioned from a flat narrow plate is depicted in U.S. Pat. No. 4,230,203 to Sweat et al. Other designs and constructions for seats in tree-climbing devices are also known. For example, a seat fashioned from crossed rods arranged in an open pattern (see U.S. Pat. No. 3,960,240 issued to Cotton), heavy gauge screen (see U.S. Pat. No. 4,452,338 issued to Untz), and other planar grid-like arrangements (see U.S. Pat. Nos. 4,316,526 and 4,331,216 both issued to Amacker, and U.S. Pat. Nos. 4,953,662 and 5,167,298 both issued to Porter) are also known. Planar seats made of wood and other materials are also known (see U.S. Pat. Nos. 4,244,445 issued to Strode, 4,137,995 issued to Fonte, and 4,987,972 issued to Helms).

Various designs for a flexible seat are also known. Flexible seat material has been arranged with side to side suspension (see U.S. Pat. Nos. 4,321,983 issued to Nelson, and 3,485,320 issued to Jones), as well as in front to rear suspension (see U.S. Pat. Nos. 3,871,482 issued to Southard, 3,955,645 issued to Dye, 4,475,627 issued to Eastridge, 4,787,476 issued to Lee, 4,802,552 and 4,890,694 both issued to Williams, 4,813,441 issued to Kepley, and 4,474,265 issued to Shinkle). Padded seats have also bee proposed for tree stands and climbers (see U.S. Pat. Nos. 4,417,645 issued to Untz, and 4,474,265 issued to Shinkle). The seats of some tree stands are designed to fold away from the platform area (see U.S. Pat. No. 4,475,627 to Eastridge, for example).

One problem associated with known tree stands concerns their portability. Naturally, a tree stand must be sufficiently light that an outdoorsman can readily transport it into wooded areas without tiring. It is common for hunters to carry their tree stand for distances of several miles before positioning the stand in a suitable tree. Considering that a person can comfortably carry up to 35% of his weight, and recognizing that hunters usually carry a rifle or shotgun weighing 7 to 10 pounds, tree stand weight needs to be confined to the range of 10 to 15 pounds.

In use, outdoorsmen frequently occupy their tree stand for many hours waiting for game animals to appear as targets for cameras and weapons. To be successful, the outdoorsman needs to be as motionless as possible regardless of the light conditions, and the weather conditions. It is, therefore, important that the tree stand have a seat which will not make the outdoorsman uncomfortable. Seats of the known tree stands are deficient in this respect. Rigid seats, and planar seats are particularly uncomfortable during long periods of use. Even seats which are flexible but which are suspended side-to-side from structural elements of the stand are uncomfortable since the cylindrical contour of the seat does not conform with the occupant's anatomy. Even flexible seats which are suspended front-to-rear have the same problem. Moreover, seats suspended front-to-rear are typically suspended between transverse bars, one of which underlies the outdoorsman's thighs when seated. Such location of a transverse bar restricts blood circulation in the legs during long periods of quiet sitting, causing the legs to "go to sleep", or become abnormally cold, or otherwise be uncomfortable. Accordingly, the outdoorsman tends to move around in the seat generating noise that can signal his presence to the outdoorsman's quarry.

Other seat arrangements have planar supports with and without padding. Such seats also become uncomfortable in use since human anatomy of the buttocks generates pressure points. Those pressure points tend to become uncomfortable when the outdoorsman occupies the tree stand for extended periods of time. As a result, simple padded seat designs are also unsatisfactory.

Another problem experienced by outdoorsmen using tree stands is the awkward and potentially dangerous situation that exists when the outdoorsman stands up on the tree stand and the seat surface interferes with his movement on the stand. Being in an elevated location that can be 20 to 30 feet above the ground, being confined to a platform with a surface area of a few square feet, and managing a combination of items such as binoculars, cameras, lenses, rifles, lunches, and clothing, dangerous situations readily present themselves.

Accordingly, it is among the objects of this invention to overcome that type of problems in the prior art tree stands and tree climbers.

SUMMARY OF THE INVENTION

An observation platform which overcomes problems with the prior art devices includes a generally rectangular platform assembly for supporting the observer which defining an observation plane relative to a vertical support such as a tree or pole. The platform assembly includes a support assembly connected thereto such that a first portion of the support assembly is disposed beneath the support plane and is operable to compressively engage the vertical support element. In addition, the support assembly includes a second portion disposed above the observation and having a vertical support contact which is vertically spaced above the first portion. To secure the observation platform from sliding downwardly along the vertical support element, an attachment assembly is provided which releasably secures the second portion of the platform means to the vertical support. Preferably, the attachment assembly includes a flexible connector which is capable to conforming to surface irregularities of the vertical support member.

Connected to the platform assembly at a location above the observation plane is a seat assembly. The seat assembly includes a pair of tubular supports with a flexible seat member suspended therebetween. The seat member has a doubly curved contour that anatomically conforms to a seated observer. So as to eliminate a rigid horizontal member under the observer's legs, the front tubular support of the seat assembly has a generally V-shape with an apex portion sized to support one end of the seat member. The apex portion is sized to be sufficiently short that it can be disposed between the observer's legs when seated. The doubly curved contour of the seat member avoids the tendency of the apex portion to move toward the observer's torso as the observer assumes a seated position in the seat assembly.

So that the seat assembly can be moved to a stowed position, the V-shaped seat support is pivotally connected to the second seat support. Thus, when an observer desires to stand on the elevated platform, rather than sit, the V-shaped seat support and the seat member can be pivotally moved to the stowed position where the V-shaped member rests against the second seat support member.

To provide reasonable lateral stability to the seat member, the second seat support is generally U-shaped with a generally horizontal portion. That horizontal portion has a length selected to about correspond to the width of the platform assembly.

Considering that observation platforms of this type are normally transported into wooded areas by outdoorsmen, a compact package is desirable. Accordingly, the generally U-shaped member may be pivotally connected to the platform assembly so that the seat assembly has a portage position closely adjacent to the platform plane. Thus, during cartage, the platform is quite compact.

BRIEF DESCRIPTION OF THE DRAWINGS

Many objects and advantages of this invention will be apparent to those skilled in the art when this specification is read in conjunction with the attached drawings wherein like reference numerals are applied to like elements and wherein:

FIG. 7 is a side elevational view of the tree stand of FIG. 1 showing the seat assembly lying on the platform means in a cartage position.

DESCRIPTION OF THE PREFERRED EMBODIMENT

Figure 1:
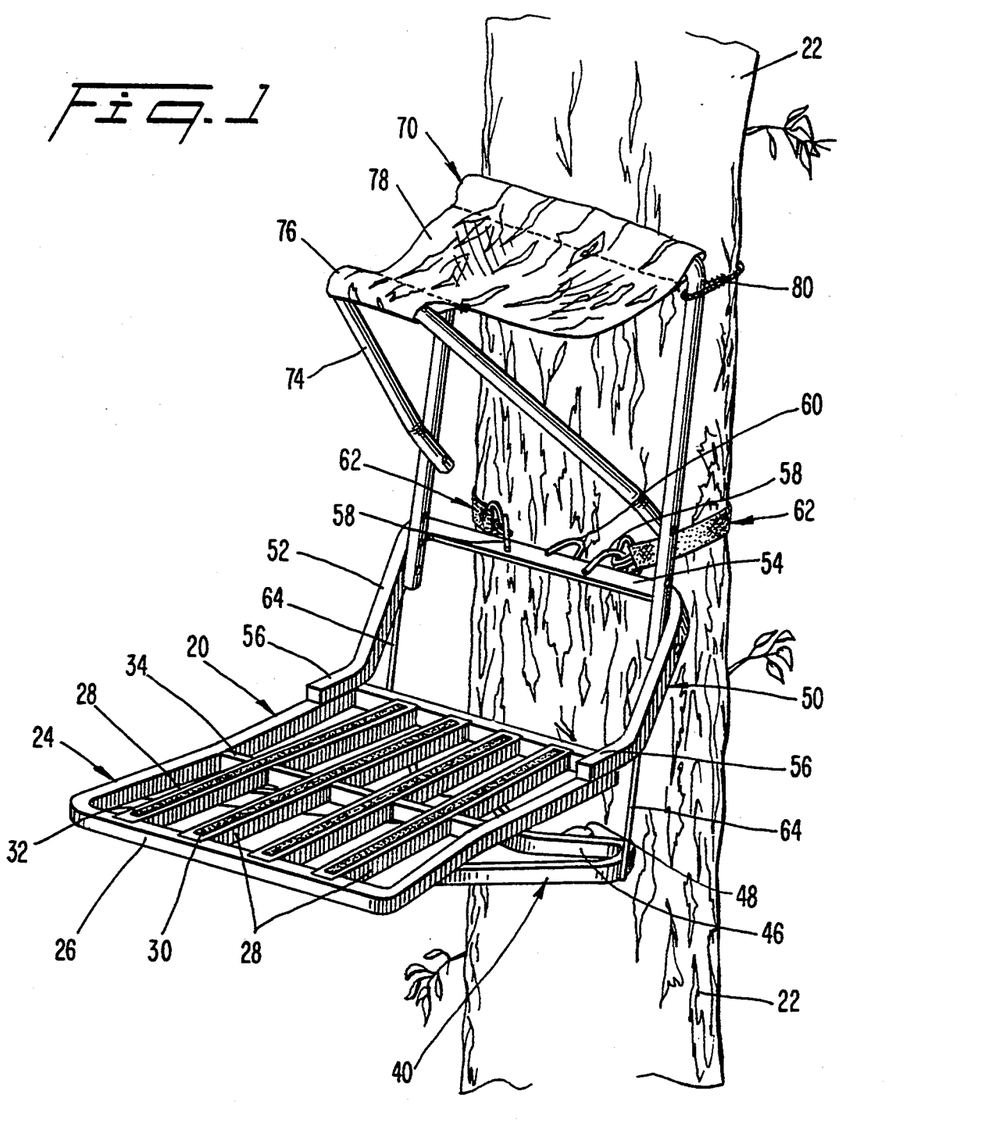
FIG. 1 is a perspective view of a tree stand having a seat in accordance with the present invention.
Figure 2:
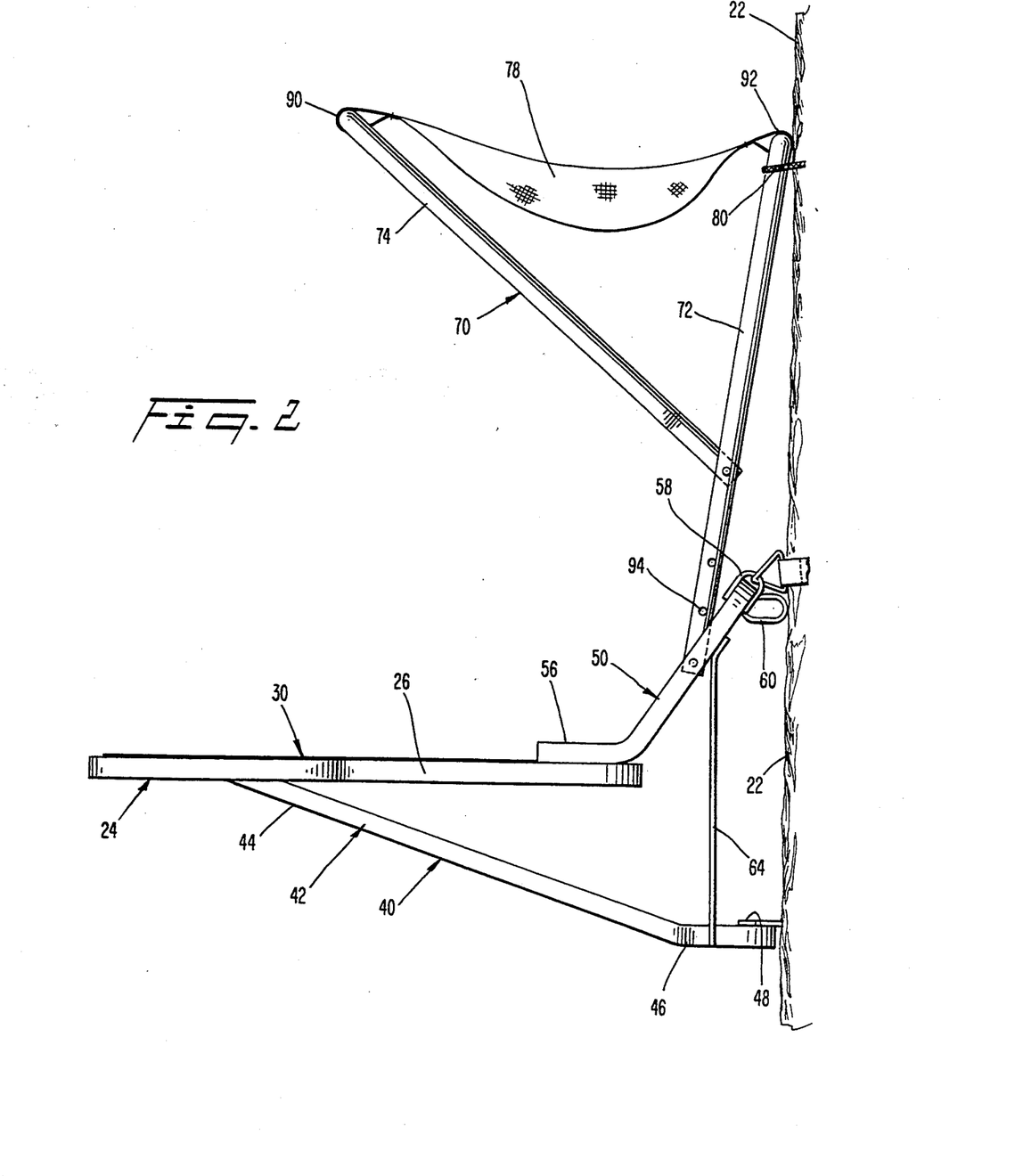
FIG. 2 is a side elevational view of the tree stand of FIG. 1.

Turning now to FIG. 1, an observation platform 20 is attached to a vertical support element, such as a tree 22. While the observation platform 20 is typically used with a tree, it will be readily appreciated that the platform 20 could also be used with a generally vertical pole or post, as well.

The observation platform 20 includes a platform means 24 having a generally rectangular shape when viewed from above. The platform means 24 is structurally designed to support an outdoorsman and defines a generally horizontal observation plane at the elevated position on the tree 22. The platform means 24 is preferably constructed with a peripheral frame 26 which may have rounded corners, as shown. Rounded corners are advantageous in that they reduce the likelihood of personal injury if the platform 20 is dropped while being carted, as well as in situations where the observer climbs over the edge of the platform 20 when assuming an observation position.

The base portion of the platform means 24 also includes a plurality of generally parallel struts 28 which extend in a direction away from the tree 22. Each strut 28 lies within the perimeter defined by the frame 26, may be formed from channel stock with a U-shaped cross section, and may include an ear 30 at each end, arranged to overlap the surface of the frame 26. When the struts are attached to the frame 26, as by welding, the ears 30 are also welded to the frame 26 thereby making a connection which is not merely subject to shear forces when the platform means 24 is occupied. Moreover, each strut 28 may be provided with a non-skid surface treatment 32 to provide a secure footing for the observer during inclement weather such as rain and/or snow. The non-skid surface treatment 32 may be applied as an adhesively backed strip of material.

To make the base portion even more rigid while inhibiting bending of the struts 28 out of the plane of the platform means 24, a continuous cross beam 34 is preferably welded into place between sides of the frame 26. Preferably, the cross beam 34 is positioned at or about the midpoint of the longitudinal length of the struts 28. The downwardly extending flange portion of each strut 28 is preferably notched to receive the cross beam 34 so that the base portion of the strut is uninterrupted and overlies the cross beam 34.

A platform support means 40 is provided to hold the platform 24 in position relative to the tree or vertical support 22. A first or bottom portion 42 of the platform support means 40 compressively engages the tree 22 so that the platform 24 does not slip downwardly. The bottom portion 42 includes a pair of bracing members 44, each being disposed on a corresponding side of the platform means 24 and each being attached to the frame 26 in close proximity to a corresponding corner of the platform means 24 remote from the location of the tree 22. Extending between the bracing members 44, adjacent to the tree 22, is a laterally extending member 46 of the bottom portion, which is preferably formed to provide a recess to accommodate the curvature of the tree 22 (see FIG. 1). Attached to the top of the member 46 are a pair of tree engaging elements 48 which project toward the tree 22 and engage the surface or bark of the tree. The elements 48 are preferably positioned so as to be symmetrically spaced from the center of the platform means 24 to thereby provide laterally spaced and balanced vertical support for the platform means 24.

The platform support means 40 also includes a second or upper portion 50 (see FIG. 1). The upper portion 50 is located above the plane of the platform means 24 and includes a U-shaped member 52 having a transverse portion 54 adjacent to the tree 22 and a pair of legs, each leg being located at a corresponding end of the transverse portion. Moreover, each leg has a foot portion 56 extending out of the plane defined by the transverse portion 54 and the legs so that the foot portion 56 lies parallel to the plane of the platform means 24. In fact, the two foot portions 56 are attached to corresponding sides of the frame 28 of the platform means 24. The attachment between the foot portions 56 and the frame 28 are located in close proximity to corresponding corners of the frame 28, and adjacent to the tree 22. Since the foot portions 56 are attached to the top of the platform means 24, positioning the attachment close to the tree 22 reduces the likelihood that an outdoorsman might accidentally snag his foot on one of the foot portions 56.

Projecting toward the tree 22 from the transverse portion 54 are two U-shaped connector brackets 58. Preferably these brackets 58 extend from the transverse portion 54 at a predetermined angle selected to approximate the direction between the attachment location and the perimeter of the typical tree with which the platform is to be used. In this manner, bending forces on the brackets 58 are minimized.

A U-shaped stand-off member 60 is also attached to the transverse portion 54. This stand-off member 60 is preferably located between the connector brackets 58 and extends toward the center of the tree and away from the transverse portion 54. In this manner, the stand-off member 60 resists lateral slippage between the tree 22 and the transverse portion 54 while the rounded end of the stand-off member 60 reduces the potential for damage to tree bark. It will readily be appreciated that more than one of these U-shaped stand-off members 60 could be used, if desired. For example, two such members, spaced laterally from one another could be used with equal efficacy.

In order to releasably attach the platform means 24 to the tree 22, an attachment means 62 is provided. The attachment means 62 may include a flexible strap with an adjustable length and a suitable conventional latching hook at each end. The latching hooks cooperate with and are attachable to the connector brackets 58 so that the flexible strap encircles the tree 22. By suitably adjusting the length of the flexible strap, the transverse portion 54 of the upper portion of the platform means 24 is securely held at an elevated position and against the tree. The U-shaped stand-off member 60 impedes slippage of the transverse portion 56 in its longitudinal direction relative to the tree. At the same time, the engagement elements 48 of the lower portion compressively engage the tree surface and hold the platform means 24 in the preferred position.

Extending between the upper portion 50 and the lower portion 40 are a pair of bracing rods 64. The respective ends of these bracing rods may be welded to the portions 40, 50. With this arrangement, the bracing rods 64 maintain the spacing between the upper and lower portions 50, 40 while reducing stresses on the welds between the frame 26 and the brackets 46 and between the frame 26 and the feet 56.

In order to minimize the weight of the platform means, it may be constructed from hollow tubular steel. In particular, 18 gauge carbon steel tubing with a generally square cross section has been found to provide appropriate strength while resulting in a platform 24 that has an acceptable weight. For example, the total weight of the platform means lies in the range of 12 to 15 pounds. The steel tubing may be galvanized to reduce deterioration from atmospheric moisture. Preferably, all connections between the frame 26, the struts 28, the upper portion 50, and the lower portion 40 of the platform means 24 are welded to prevent squeaks that are characteristic of mechanically fastened joints.

To permit an outdoorsman using the observation platform to sit down, a seat means 70 is connected to the platform means 24 and located above the plane of the platform means 24 (see FIG. 1). The seat means includes a first generally U-shaped support 72, the ends of which are pivotally connected to corresponding legs 52 of the upper portion 50. The pivot location is selected to have close proximity to the transverse portion 54 of the upper portion 50 so that the outdoorsman's weight, when seated, exerts a force moment that maintains the compressive engagement between the bottom portion 40 of the platform means 24 and the tree 22.

Figures 5, 6:
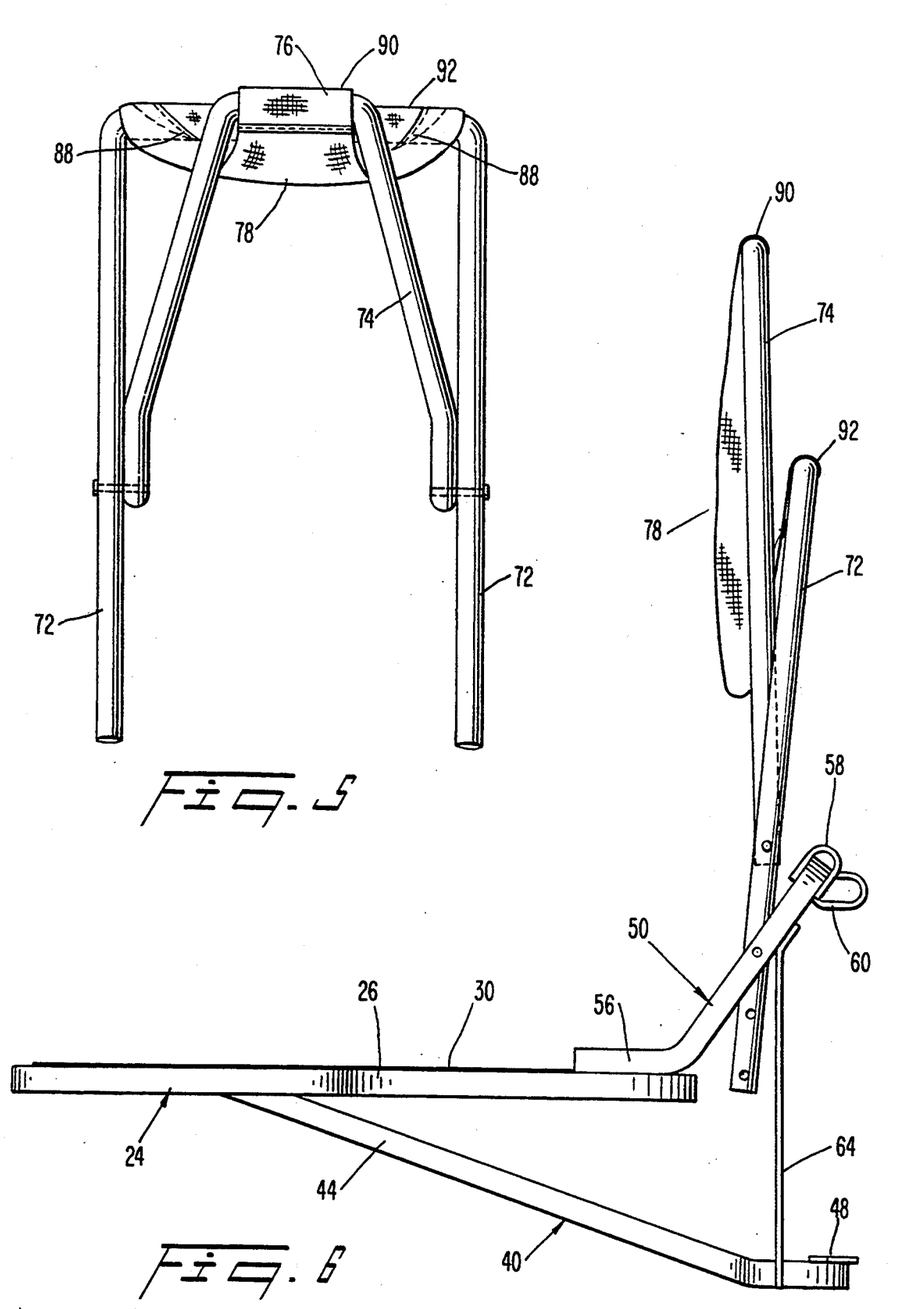
FIG. 5 is a front elevational view of the seat portion of FIG. 3.
FIG. 6 is a side elevational view similar to FIG. 2 showing the seat support in a stowed position.

The seat means 70 also includes an inverted, V-shaped support 74 having a generally horizontal apex portion 76. The support 74 is pivotally connected to the U-shaped support 72 so that the apex portion 76 can swing toward and away from the tree in a generally radial direction. With the arrangement, the seat means 70 has an operative position (shown in FIG. 1) and a stowed position (shown in FIG. 6) where the apex portion 76 is adjacent the tree 22.

Suspended between the generally horizontal portion of the U-shaped support 72 and the apex portion of the V-shaped support 76 is a flexible seat member 78. As will be described more fully below, the seat member 78 has a doubly curved configuration capable of anatomical conformation to a seated outdoorsman's posterior. To secure the seat assembly 70 in its operative position, a lanyard means 80 encircles the tree 22 and is connected at each end to a corresponding side of the U-shaped seat support 72. The length of the lanyard means 80 is adjustable so that the U-shaped seat support 72 of the seat means 70 can be held securely against the tree 22 and be restrained against radial displacement relative to the tree 22.

The apex portion 76 of the V-shaped seat support 74 has a length selected to comfortably fit between the thighs of an outdoorsman, when seated. It has been found that a length of about 3 to 4 inches can comfortably be used. The generally horizontal portion of the U-shaped seat support 72 has a predetermined length which is several times greater than the length of the apex portion 76. The horizontal portion length is selected so as to approximate the width of the platform means 24 so that the back of the seat member 78 is given as much lateral stability as is conveniently possible, consistent with having an observation platform that is collapsible for transportation or cartage. Moreover, the short length of the apex portion, coupled with its intentional positioning between the outdoorsman's thighs eliminates rigid members underlying the outdoorsman's thighs which tend to reduce blood circulation giving rise to discomfort while sitting.

Figure 3:
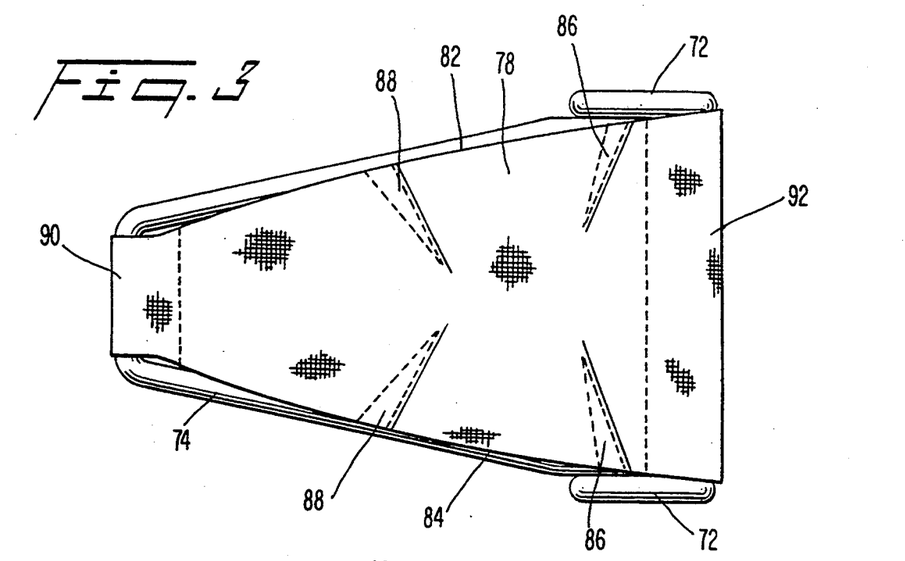
FIG. 3 is a top view of the seat portion of the tree stand of FIG. 1.
Figure 4:
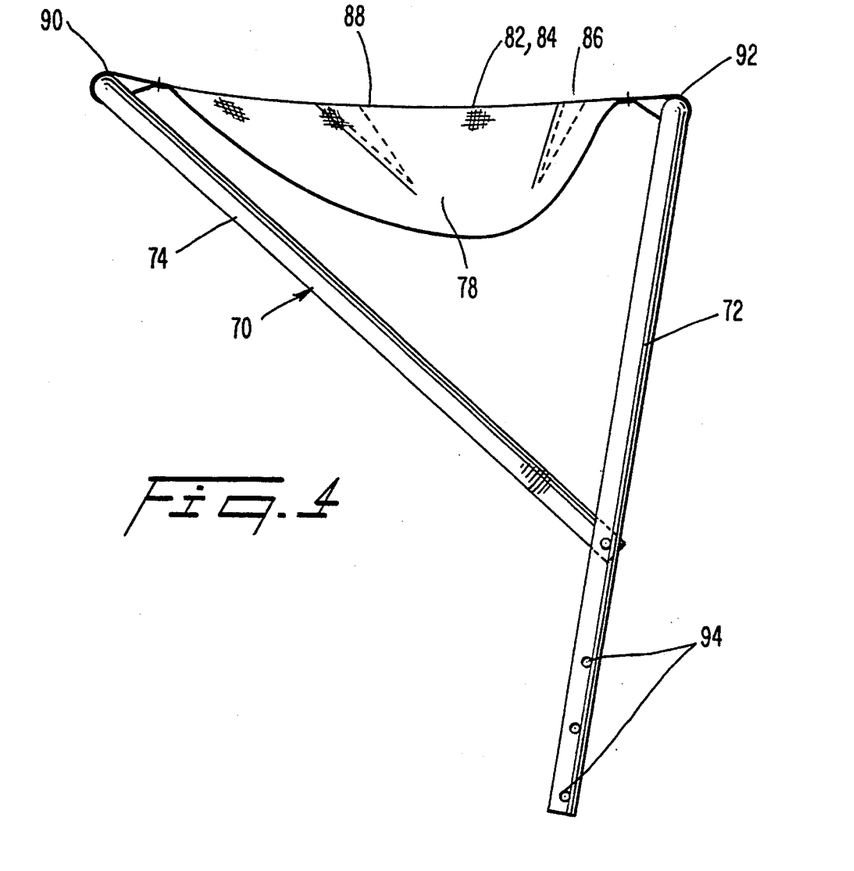
FIG. 4 is a side elevational view of the seat portion of FIG. 3.

Rather that a rigid member, the outdoorsman's thighs rest on the side edges 82, 84 (see FIG. 3) of the seat member 78. Each edge 82, 84 of the seat member has at least one, and preferably two, pleats 86, 88 which are generally triangular. The short triangular side is preferably arranged to be generally parallel with the corresponding edge 82, 84. Since the cross section of seat material through the pleat has a Z-shape, the length of the pleat at the corresponding edge 82, 84 is about ⅓ of the amount by which the pleat shortens the fabric at the edge relative to the center of the seat member 78. The pleats 86 and the pleats 88 are symmetrically positioned with respect to a longitudinal axis of the seat member 78 (see FIG. 4 and FIG. 5) so that lateral balance of the seat member 78 is maintained. Moreover, the pleats 86, 88 are generally directed toward the center of the seat member 78 (see FIG. 3) and have a length, measured from the corresponding edge 82, 84 of about ⅓ the distance across the seat member. With this arrangement of the pleats, the seat member has a doubly curved contour, that is, it is not a flat shape when folded. Rather, the seat member 78 has a bowl shape that approximates a portion of a spherical surface.

The doubly curved surface is particularly desirable in a flexible seat member 78 for several reasons. The generally spherical shape requires less pivotal movement of the apex portion 76 when the outdoorsman sits down than does a single curved (e.g., cylindrical) surface. Accordingly, the apex portion stays further away from the outdoorsman's crotch. Thus, the doubly contoured configuration operates as a self-limiting design on pivotal movement of the V-shaped member. In addition, the generally spherical shape anatomically conforms more naturally to the outdoorsman's posterior shape than does a singly curved surface. Accordingly, the pressure applied to the posterior to support the outdoorsman is distributed over a larger area and in a more uniform fashion.

Each end of the seat member 78 (see FIG. 4) is provided with a sleeve 90, 92 to receive a corresponding one of the V-shaped seat support 74 and the U-shaped seat support 72. Accordingly, when the seat means is assembled, the seat member 78 is restrained from dislocation on the seat supports 72, 74 since substantial twisting and warpage of the seat material would be required.

The seat member 78 is preferably fabricated from a heavy woven material such a canvas cloth. Other materials, including synthetic materials, may also be used. When the observation platform is to be used for wildlife observation, it may be desirable to provide a camouflage design on the seat member (see FIG. 1) to visually obscure the seat and its occupant. Consistent with a desire to obscure the platform means 24, it is also within the scope of the present invention to apply a non-reflective coating, such as a flat paint, to all metal surfaces of the platform means 24. As a result, there is a substantially diminished likelihood of detection.

Each side of the U-shaped seat support member 72 may also be provided with a plurality of spaced apart pivot adjustment holes 94. These pivot adjustment holes 94 can be used to adjust the height of the seat member 78 to accommodate the personal preference and comfort of the outdoorsman, and can thus be described as a seat height adjustment means. In addition, the adjustment holes 94 most nearly adjacent to the end of the support member 72 may facilitate packaging of the observation platform for sale and shipment.

In use, the observation platform is carried to the observation location with the seat means collapsed against the plane of the platform means 24 (see FIG. 7).

The platform is placed at the desired elevation by climbing the tree, for example. The flexible belt of the attachment means 62 (see FIG. 1) is wrapped around the tree and then attached to the corresponding bracket 58. The length of the flexible belt may be adjusted before or after attachment. In any event, when the flexible belt has been attached with the tree enveloped thereby, the platform means 24 is fully capable of supporting the outdoorsman at the elevated location.

The seat means 70 is then connected to the tree 22. The U-shaped member is pivoted from the stowed position, upwardly and into contact with the tree 22—the operating position. The lanyard means 80 is then wrapped around the tree 22 and connected to the U-shaped seat support 72 so that the seat means will not pivot from the tree during use. Finally, the V-shaped seat member 74 is pivotally moved from its non-interfering position to its operative position where the seat member 78 is deployed to be accessible to outdoorsman.

It will now be apparent that a new observation platform having an anatomically conforming seat has been described which overcomes problems associated with the prior art devices. Moreover, it will be apparent to those skilled in this art that numerous modifications, variations, substitutions, and equivalents exist for various features of the invention which do not materially depart from the spirit and scope of the invention. Accordingly, it is expressly intended that all such modifications, variations, substitutions, and equivalents which fall within the spirit and scope of this invention, as defined by the appended claims, shall be embraced thereby.

What is claimed is:

1. An observation platform adapted for detachable connection with a vertical support, comprising:
   platform means for supporting an observer, having a generally rectangular shape, and
   defining an observation plane and including
      platform support means for compressively engaging a vertical support at a position below the observation plane, connected to the platform means with a first portion located under the observation plane, and a second portion located above the observation plane; and
      attachment means for releasably securing the platform means to the vertical support, including a flexible tensile connector; and
   seat means positioned above the observation plane, connected to the platform means, and having two supports, a flexible seat member having front and rear portions, suspended between the two supports, the seat member being non-planar, substantially continuous fabric, the front portion being narrower than the rear portion, and having a doubly curved contour capable of anatomical conformation to a seated observer.

2. The observation platform of claim 1 wherein the seat member comprises an approximation of a spherical surface.

3. The observation platform of claim 1 wherein the seat member is pleated so as to define a generally bowl-shaped surface.

4. The observation platform of claim 3 wherein seat member has a pair of edges, each edge extending between the two supports, wherein each pleat is generally triangular having a short side and a length, the short side of each pleat being along the corresponding seat member edge, and the length being less than half the seat member width.

5. The observation platform of claim 1 wherein the platform means is provided with a non-skid surface.

6. The observation platform of claim 1 further included means for adjusting the height of the seat means.

7. The observation platform of claim 1 wherein the platform means includes a stand-off member for retarding lateral slippage of the observation platform relative to the vertical support.

8. An observation platform adapted for detachable connection with a vertical support, comprising:

platform means for supporting an observer, having a generally rectangular shape, and defining an observation plane and including platform support means for compressively engaging a vertical support at a position below the observation plane, connected to the platform means with a first portion located under the observation plane, and a second portion located above the observation plane; and attachment means for releasably securing the platform means to the vertical support, including a flexible tensile connector; and seat means positioned above the observation plane, connected to the platform means, and having two supports, a flexible seat member suspended between the two supports, and the seat member having a doubly curved contour capable of anatomical conformation to a seated observer;

wherein the seat supports include a first, generally U-shaped member, and a second generally V-shaped member, the V-shaped member being pivotally connected to the U-shaped member.

9. The observation platform of claim 8 wherein the generally V-shaped member has an apex portion, the generally U-shaped member has a generally horizontal portion, and the seat member is suspended between the apex portion of the V-shaped member and the generally horizontal portion of the U-shaped member so that the seat member is suspended at locations radially displaced from one another relative to the vertical support.

10. The observation platform of claim 8 further including lanyard means connectable with the seat means and the support member so that the seat means is radially restrained relative to the vertical support.

11. The observation platform of claim 8 wherein the seat means is pivotally connected to the platform means so that the seat means can be folded against the platform means for transportation.

12. The observation platform of claim 8 wherein the generally V-shaped member is pivotally connected to the generally U-shaped member so that the seat means can be pivotally moved to a non-interfering position.

* * * * *